United States Patent [19]
Sointula

[11] Patent Number: 5,867,124
[45] Date of Patent: Feb. 2, 1999

[54] PROCESSING AN ENCODED MARKER

[75] Inventor: Erkka Sointula, Marynummi, Finland

[73] Assignee: Nokia Mobile Phones Limited, Salo, Finland

[21] Appl. No.: 753,110

[22] Filed: Nov. 20, 1996

[30] Foreign Application Priority Data

Nov. 24, 1995 [FI] Finland ................................. 9524095

[51] Int. Cl.$^6$ ................................. G01S 5/02; G01S 3/52
[52] U.S. Cl. ......................................................... 342/418
[58] Field of Search ............................. 342/418, 99, 104, 342/108

[56] References Cited

U.S. PATENT DOCUMENTS

| 5,212,489 | 5/1993 | Nelson | 342/109 |
| 5,257,257 | 10/1993 | Chen et al. | 370/18 |
| 5,566,168 | 10/1996 | Dent | 370/50 |

FOREIGN PATENT DOCUMENTS

| 0 115 152 | 8/1984 | European Pat. Off. . |
| 2232852 | 12/1990 | United Kingdom . |
| 2243058 | 10/1991 | United Kingdom . |

*Primary Examiner*—Theodore M. Blum
*Attorney, Agent, or Firm*—Perman & Green, LLP

[57] ABSTRACT

An encoded marker is transmitted as a paging signal for mobile satellite telephones. The signal is susceptible to Doppler effects, and the processing procedures are arranged to determine the Doppler characteristics of subsequent signals. The marker takes the form of a first frequency sweep occurring in a first direction followed by a second frequency sweep occurring in the opposite direction. The markers are correlated against sweep signatures to produce amplitude peaks. The mid-point between the peaks and the spacing between the peaks allows timing offsets and frequency shifts to be accurately calculated, thereby facilitating the processing of subsequent data signals.

21 Claims, 10 Drawing Sheets

PROCESSING AN ENCODED MARKER

FIELD OF INVENTION

The present invention relates to processing encoded markers in transmitted signals. In particular, the invention relates to processing markers in signals susceptible to Doppler effects, such as signals transmitted between orbiting satellites and ground stations.

BACKGROUND OF INVENTION

Satellites are being used increasingly for providing communication links between stations of different locations throughout the world. Initially, such links were provided for use at sea where, given the availability of power from ocean-going vessels, direct communications to satellites could be achieved. Recently, this approach has been extended to mobile units, powered from local batteries, using relatively low orbiting satellites.

In order for low orbiting satellites to remain in orbit, it is not possible for them to orbit at the rotational speed of the earth and thereby remain geostationary. As a result, there is a relative velocity between the ground stations and the orbiting satellites and procedures must be implemented in order to establish a communication link, at any one time, with a satellite that is within range. Thus, such an approach could be compared to terrestrial cellular systems, in which the ground stations remain stationary with a relative velocity being created by a roaming mobile.

In terrestrial situations in which a mobile roams between transmission cells, it is necessary to provide complex handover routines as a mobile moves from cell to cell, as is known in the art. However, the relative speed of the mobiles, compared to the transmission frequencies, is negligible therefore the movement of the mobile does not affect the characteristics of the signal itself and, from a signal analysis point of view, the mobiles may be treated as being effectively stationary.

In satellite systems the problem of roaming from one satellite position to another is also present and again complex procedures must be put in place to ensure that a communication link can be handed over from one system to another while a call is taking place. However, another problem is introduced in that the velocity of the orbiting satellites is such that the transmitted signals will experience Doppler effects. Thus, transmission frequencies will appear higher as the satellite is moving towards a ground station and, similarly, the transmission frequency will appear lower as the satellite is moving away from said ground station. Thus, frequency channels from one satellite may impinge upon channels from a neighbouring satellite unless a very large spacing is provided between adjacent channels or groups of channels from respective satellites. Furthermore, most frequency channels convey a plurality of digital signals as a time division multiplex and frequency shifting may therefore disrupt channel allocation of the time division multiplex. Furthermore, timing offsets will also occur due to the position of the satellite. Thus, before a connection may be established for the transmission of actual data, it is necessary to identify the nature of the data so as to identify the extent to which the frequency of a message has been modified by Doppler effects and the extent to which the start of the message has been shifted in phase so as to locate the message within the correct time division multiplex channel.

BRIEF SUMMARY OF THE INVENTION

According to the present invention there is provided a method of processing an encoded marker in a transmitted signal, wherein said signal is susceptible to Doppler effects such that the timing phase and frequency of said signal are variable, comprising the steps of transmitting said marker in the form of a first frequency sweep followed by a second frequency sweep, wherein the direction of said second sweep is in the opposite sense of the direction of said first sweep; receiving said marker and correlating said received marker to produce two amplitude peaks; and processing characteristics of said peaks to determine an extent of a Doppler effect.

An advantage of the present invention is that it substantially reduces processing requirements for assessing changes in characteristics due to Doppler effects, primarily phase offsets and frequency shifts.

In a preferred embodiment, pre-processing is performed in order to identify the existence of an encoded marker prior to said marker being processed so as to determine changes due to Doppler effects. In this way, overall power consumption may be reduced.

The first frequency sweep may descend from a relatively high frequency to a relatively low frequency, whereafter said second frequency sweep may ascend from a relatively low frequency to a relatively high frequency. However, in a preferred embodiment, the first sweep ascends from a relatively low frequency to a relatively high frequency whereafter the second sweep descends from a relatively high frequency to a relatively low frequency. Preferably, the sweeps occur from a first side of a nominal frequency level to the opposite side of said nominal frequency level.

According to a second aspect of the present invention, there is provided mobile telephone apparatus arranged to receive paging signals from a satellite transmitter, wherein said paging signals comprise a marker in the form of a first frequency sweep followed by a second frequency sweep, wherein the direction of said second sweep is in the opposite sense to the direction of said first sweep, comprising correlating means for correlating said received marker to produce two amplitude peaks; and processing means for processing characteristics of said peaks to determine an extent of a Doppler effect.

In a preferred embodiment the apparatus includes sampling and digitising means for digitising the received marker. Preferably, the correlating means includes storage means arranged to store values that are correlated against said digitised samples. Furthermore, the correlating means may include a shift register for receiving the digitised samples and means may be provided for multiplying non-zero store values with digitised sample values.

In an alternative embodiment, the correlating means includes two standing acoustic wave filters each tuned to produce output peak in response to a respective received frequency sweep.

Preferably, the processing means is arranged to calculate mid-point between said peaks to determine the position of a transmitted marker. Preferably, the processing means includes means for determining the distance between said peaks so as to determine a degree of Doppler frequency shift. The Doppler frequency shift represents a frequency offset of a received carrier frequency relative to the carrier frequency which the mobile is expecting (the mobile frequency accuracy being typically 1–5 ppm).

DETAILED DESCRIPTION OF EMBODIMENTS OF THE INVENTION

The invention will now be described by way of example, with reference to the accompanying drawings.

Figure 1:
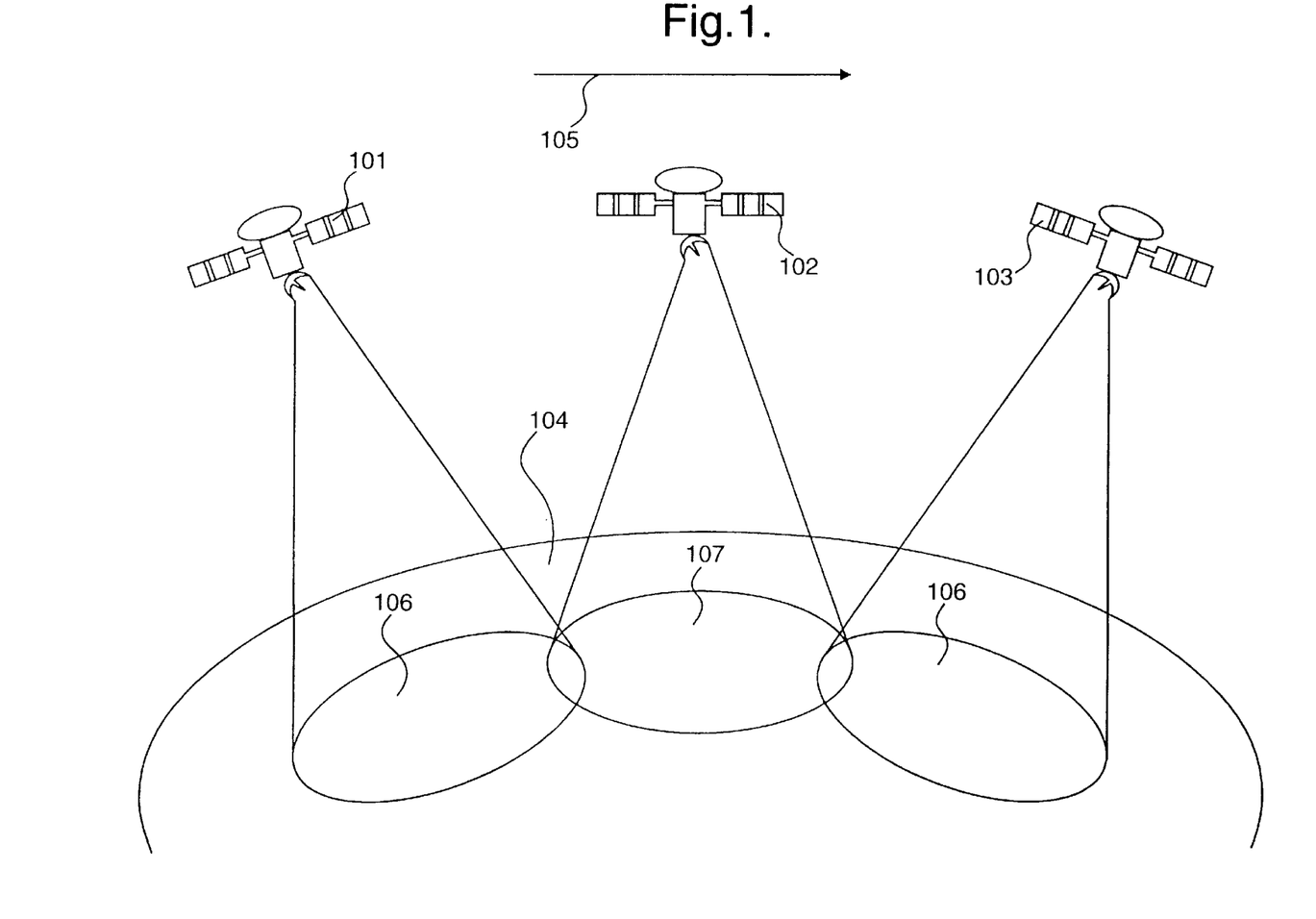
FIG. 1 shows a plurality of satellites orbiting around the earth, with associated coverage regions.

Three low orbiting satellites 101, 102 and 103 are shown in FIG. 1, orbiting in non-geostationary orbit at a height above the earth 104 of five thousand nautical miles.

In order to remain in orbit, the satellites orbit around the earth at a velocity relative to the earth identified by arrow 105. Each satellite is capable of communicating with ground stations on the earth within respective communication regions. Thus, satellite 101 may communicate with ground stations in region 106, satellite 102 may communicate with ground stations within region 107 and satellite 103 may communicate with ground stations within region 108. These regions overlap to some extent and control protocols, under the control of a control station, are responsible for effecting switching between satellites as the satellites move overhead. Similarly, regions 106, 107 and 108 are not permanent and traverse around the globe in line with the orbiting satellites.

Figure 2:
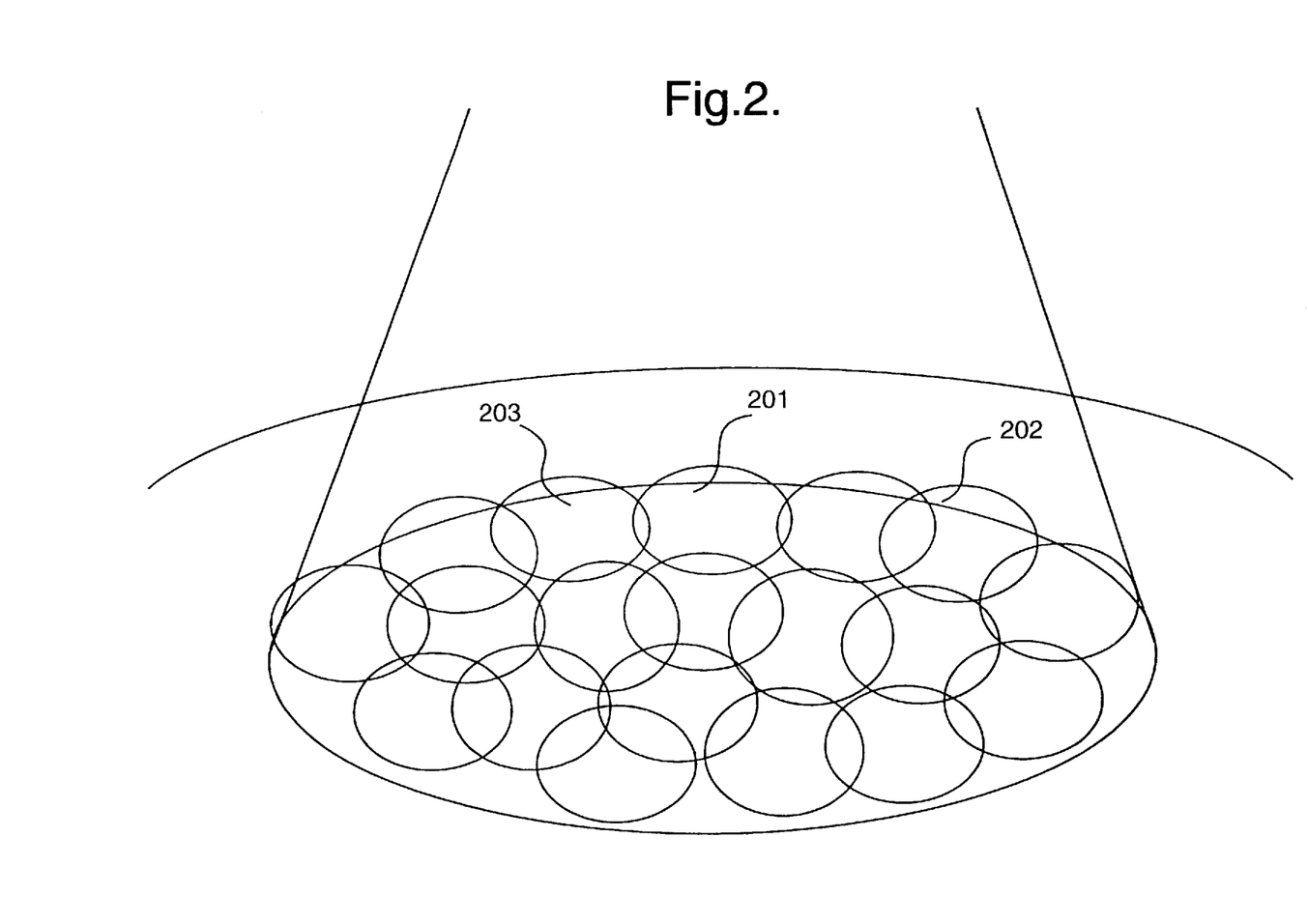
FIG. 2 details a plurality of sub-regions for one of the regions shown in FIG. 1.

Region 107 is expanded in FIG. 2. The region covered by satellite 102 is divided into a plurality of sub-regions, such as sub-regions 201 and 202 etc. The satellite 102 is capable of transmitting over a plurality of communication frequencies and sub-regions 201 and 202 etc. are defined by allocating specific frequencies for these sub-regions. Thus, a set of frequencies may be available for communicating with ground stations within sub-region 201, with different frequencies being allocated for adjoining regions 202 and 203. Thus, a control protocol is provided to facilitate switching between satellites 101, 102 etc. as the satellites orbit overhead. In addition, the array of sub-regions 201, 202, 203 etc. also traverses across the globe, therefore it is necessary for switching to be effected between sub-regions and for communication channels to be switched so as to operate over different transmission frequencies.

Figure 3:
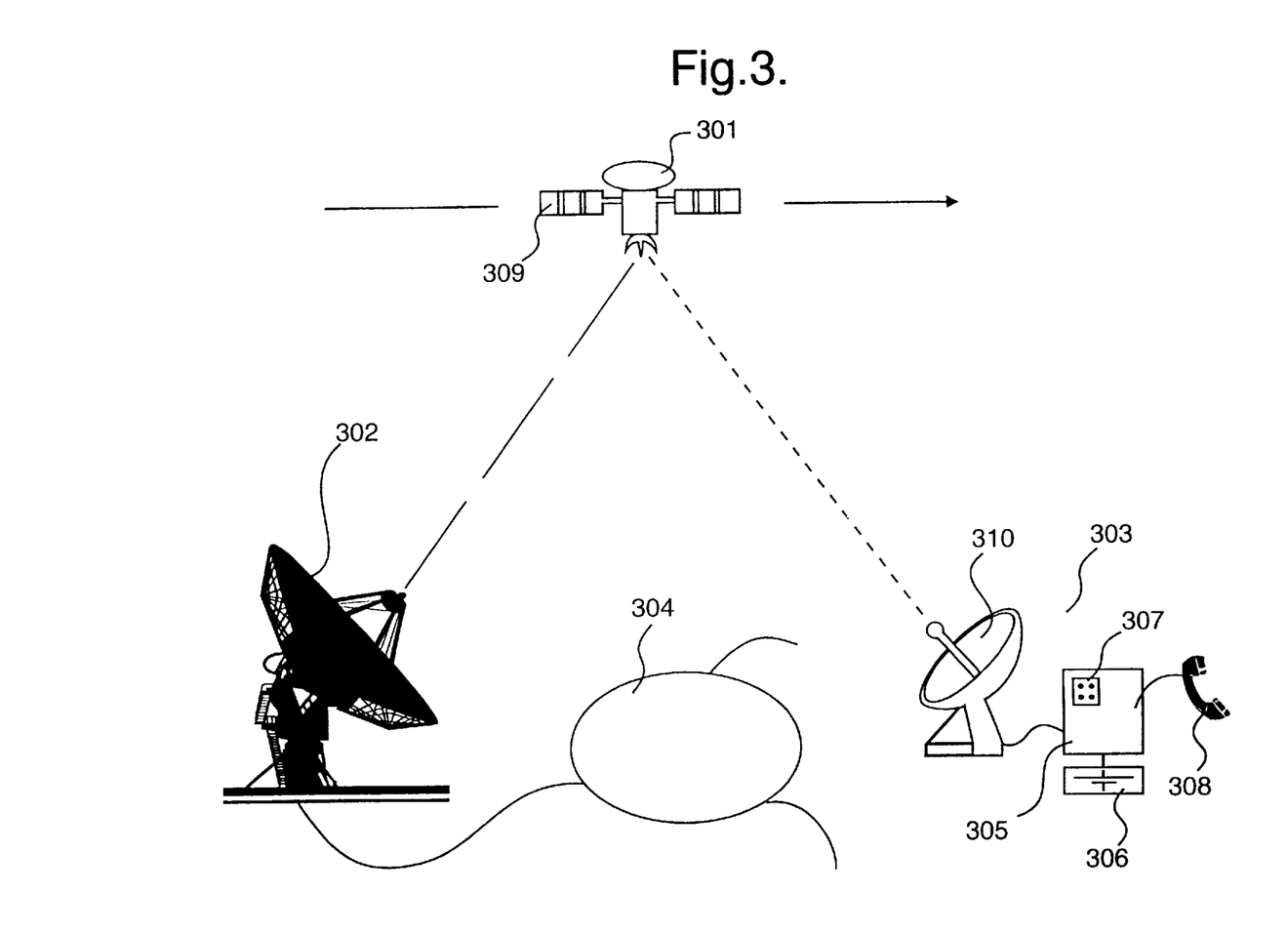
FIG. 3 illustrates a satellite communicating with a mobile telephone and a fixed telecommunications base station, wherein said telephone includes processing circuitry for detecting paging signals.

A satellite 301 is shown in FIG. 3, communicating with a ground station 302 and a mobile telephone system 303. The ground station 302 is connected to a terrestrial telephone network 304. It is possible for a conventional telephone to contact the satellite telephone system 303 via the telephone network 304. A paging signal is generated by the ground station 302 and transmitted to satellite 301. The satellite 301 redirects this paging signal to all sub-regions within its communication region, so that said signal may be detected by the mobile satellite telephone 303. The mobile satellite telephone includes a processing device 305, including a duplexed receiver and transmitter sub-system. These are powered by a rechargeable battery pack 306 and respond to manual operation of a keypad 307 to provide telecommunication facilities to an operator via a handset 308.

The data transmitted from the ground station 302 to the satellite 301 modulates a carrier of approximately 2 GHz arranged to convey a plurality of 3 KHz voice channels. Given that the communication link from the ground station 302 to the satellite 301 and the communication link from the satellite 301 to the telephone system 303 are inclined with respect to the horizon, it is possible for the transmission frequencies to be used again for conventional terrestrial broadcasts, conveyed tangentially to the earth's surface. The two broadcasts will not interfere if their power spectral densities are restrained within recognised limits. Thus, the output power from the ground station 302 to the satellite 301 is restricted so as to ensure that there is no interference caused to conventional terrestrial broadcasts. Similarly, transmissions from the satellite 301 and the mobile station 303 are also restricted for this reason, in addition to being restricted by the amount of power available from their respective power sources. Thus, the maximum output power from the satellite 301 will also be restricted in terms of the amount of power available from its solar panels 309 and the mobile station 303, being powered by rechargeable batteries, must also operate within realistic power consumption constraints. Furthermore, it is also desirable to reduce transmission power, so as to reduce operator exposure to potentially harmful radiation.

A problem with placing a constraint on telephone systems, to the effect that they require a particular physical configuration before a telephone call may be received, is that the system does not lend itself to receiving unexpected calls. Thus, if calls can only be received when an antenna is placed in a line of sight configuration, calls cannot be received in any other orientation. Clearly, satellite telephone systems of this type tend to be used under extreme conditions, therefore an inability to make calls to the satellite system as and when required creates a significant limitation to the use and commercial exploitation of such systems. It is therefore known to provide signalling channels, such that a paging signal may be supplied to a satellite mobile telephone even in situations where an antenna is not configured in its optimum orientation or where reception is impaired due to environmental conditions or when indoors etc.

Three techniques are known for improving the probability of a receiver telephone being able to receive paging signals when not arranged in an optimum configuration. Firstly, the transmitted signals stands a better chance of being received if the amount of power transmitted is increased. Given the aforesaid constraints concerning interference, it is not possible to increase the power flux above pre-set limits, although in some situations it may be possible to increase power output if normal operation is effected below the established maximum. However, in normal operation, insufficient power would be available given normal bandwidth operation and power spectral density constraints.

In order to increase the amount of power transmitted, without exceeding power spectral density levels, the bandwidth of the transmission may be increased, thereby increasing the overall power transmitted while at the same time restraining the amount of power transmitted at any particular frequency; that is to say, the power spectral density is restrained within agreed limits. Thus, a second technique for improving the probability of a signal being received consists of spreading the transmitted information over a wider transmission bandwidth.

Thirdly, in order to reduce the effects of noise, it is possible to introduce redundancy into the signal, thereby increasing the coding rate. Thus, the overall signal to noise ratio is improved if the actual information content of the signal is reduced. A paging signal may occupy a larger bandwidth than normal transmission signals and thereby provide a communication channel capable, in theory, of transmitting a higher data rate. However, the actual amount of information conveyed at this higher data rate is effectively reduced below the normal rate of information exchange by introducing higher levels of information redundancy.

Figure 4:
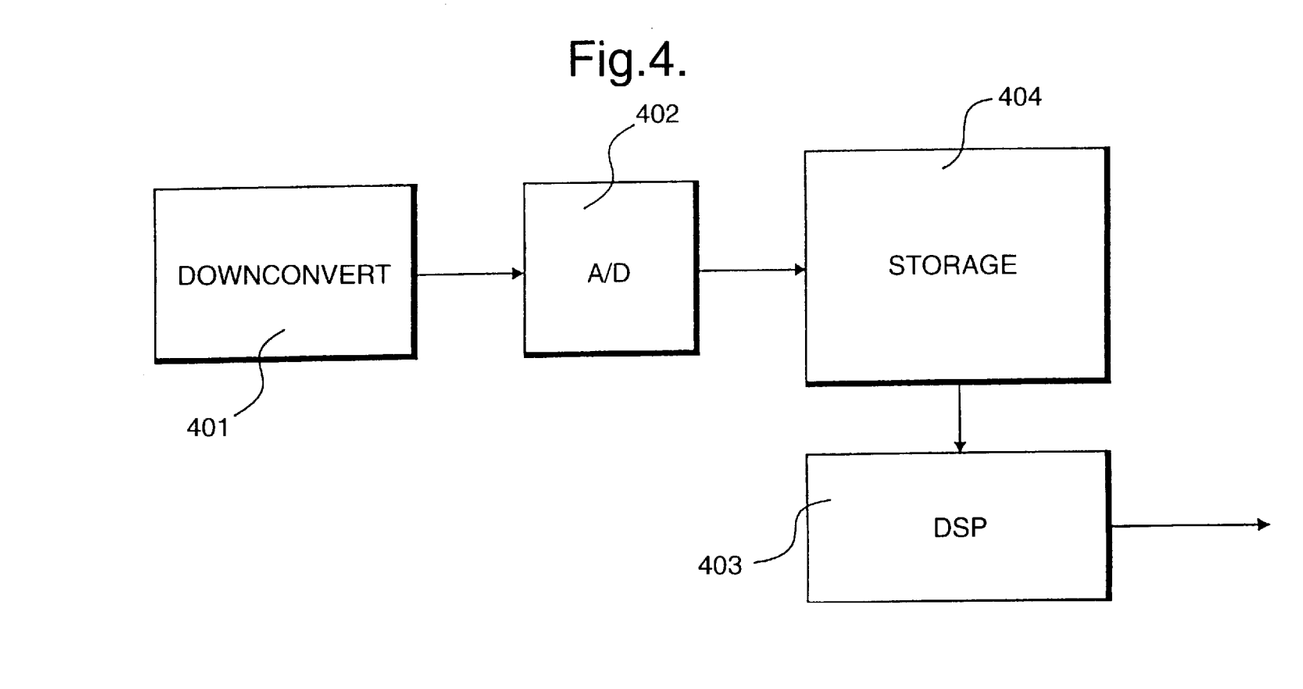
FIG. 4 details the processing circuitry identified in FIG. 3, including a digital signal processor for identifying the start of a message.

Processing device 305 is detailed in FIG. 4. The signal received by the antenna 301 is downconverted by device 401 to produce a base-band or low IF signal that is supplied to an analogue-to-digital convertor 402. The analogue-to-digital convertor 402 is required to sample the incoming signal at a rate of at least twice the original data rate, although, in practice, the convertor samples the incoming signal at a higher rate such as approximately ten times the incoming data rate. The incoming data is processed, in accordance with known techniques, via a digital signal processor 403 arranged to identify the original data contained within the digital samples produced by convertor 402.

In known systems, a significant amount of processing power is required in order to ascertain the extent of changes occurring due to Doppler effects. In particular, it is necessary to determine the extent of frequency shifts and to deduce the extent of temporal offsets introduced to the modulated signal. It is not possible, for example in hand held telephones, to process this information in real time, given that the degree of processing required is substantially greater than that required during normal steady-state processing; that is once the frequency shift and temporal offset have been determined. Consequently, in order to process the volume of sampled data, the data produced by the analogue-to-digital convertor 402 is written to an intermediate storage device 404, in conventional systems, whereafter, the DSP system 403 accesses this data in order to identify the start of transmitted data, effectively in non-real time.

It is desirable to reduce the size of the storage device 404 and this is achieved, in accordance with the present invention, by encoding the original data in such a way that the start of a message and the frequency of message transmission is more easily determined. In particular an encoded marker is transmitted, identifying the start of a signal susceptible to Doppler effects. The marker is transmitted in the form of a first frequency sweep followed by a second frequency sweep, these sweeps also being known as "chirps" in the art. The direction of the second sweep is in the opposite sense to the direction of the first sweep. Thus, for example, in the preferred embodiment, the first frequency sweep ascends and the second frequency sweep descends; although this order could be reversed if preferred. The received signal is digitised and the digital values are compared against predetermined values to produce amplitude peaks in response to the sweeps. These peaks are then processed to determine the mid-point between them, defining the position of the marker, and the distance between them, so as to define the Doppler frequency shift.

Figure 5:
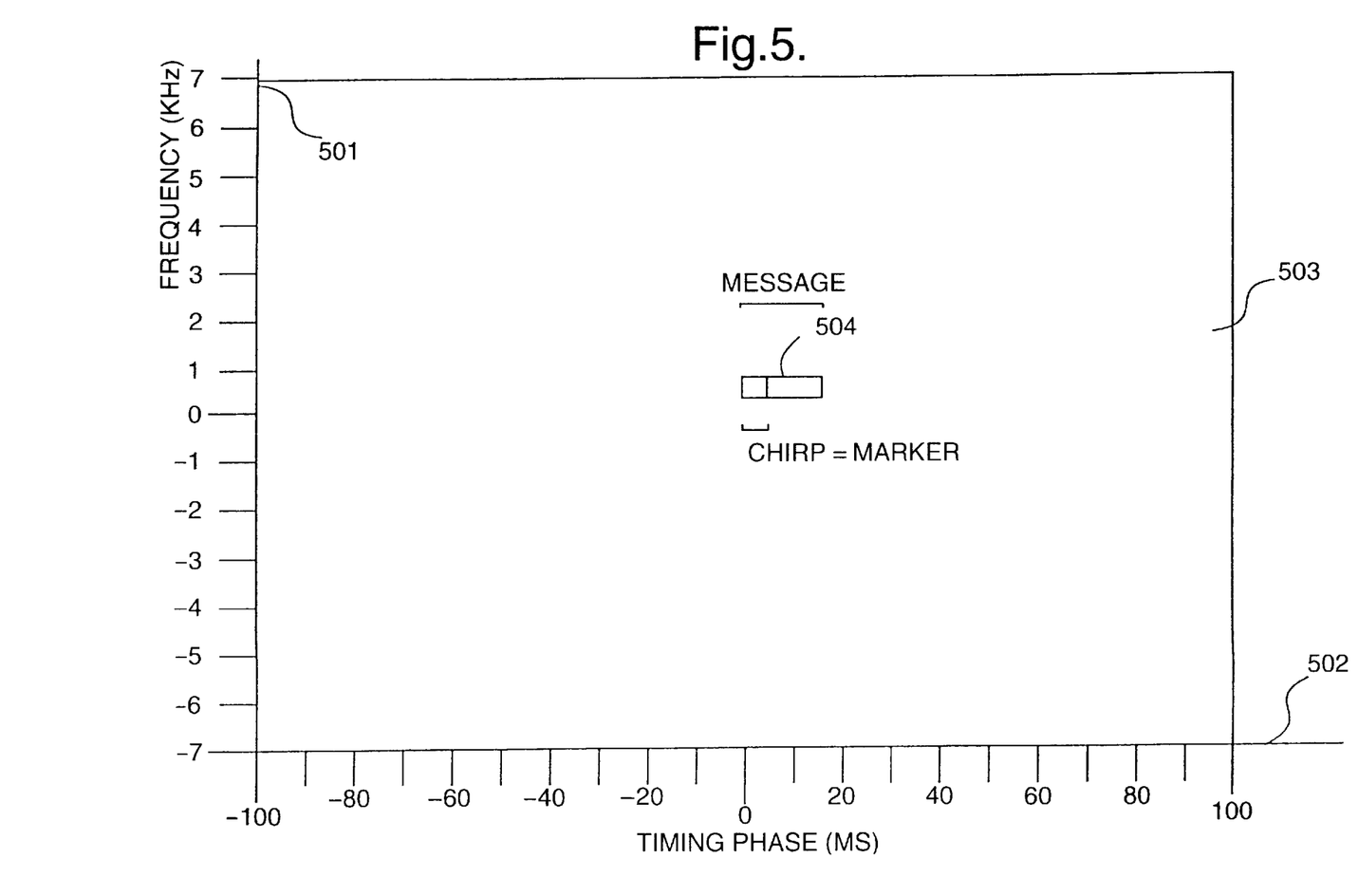
FIG. 5 represents an example of the extent to which a message start may be shifted in terms of frequency and phase due to satellite location.

The problem associated with identifying the start of a transmitted message, by identifying a marker placed at the start of said message, may be appreciated by referring to FIG. 5. In this example, the frequency of a transmitted signal, due to Doppler effects, may be increased or decreased from its nominal value by up to seven KHz. This is represented by axis 501 in FIG. 5, ranging from −7 KHz to +7 KHz. Similarly, timing phase is represented by axis 502, ranging from −100 milliseconds to +100 milliseconds. Thus, a start of a message may lie anywhere within space 503; the size of the message itself being represented by space 504. Thus, for any particular transmission, the message space 504 may be located anywhere within the overall space 503 and in earlier systems it would have been necessary for the DSP 403 to identify its particular location.

Figure 6:
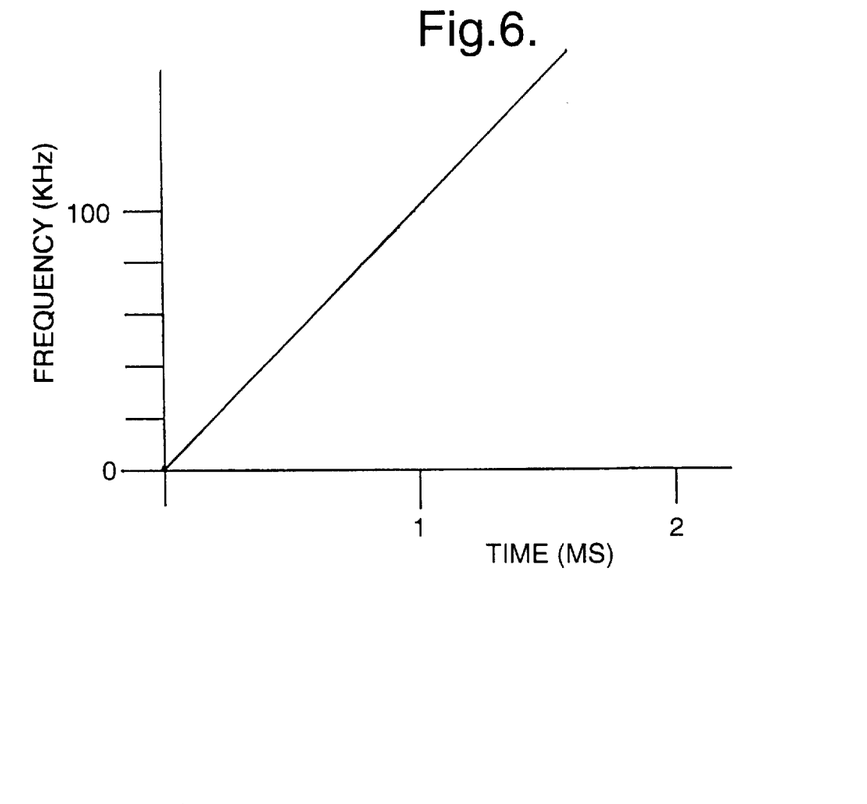
FIG. 6 shows a graph of frequency plotted against time for a start of message "chirp"
Figure 7:
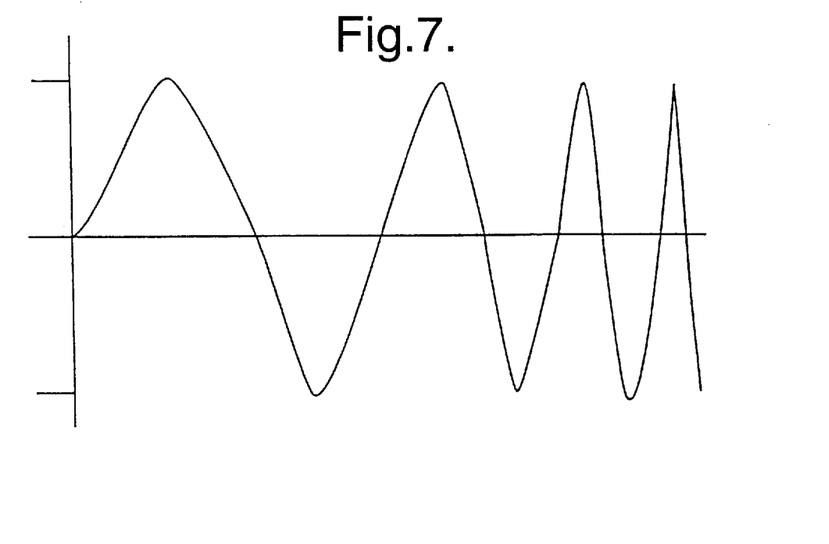
FIG. 7 shows a resulting sinusoid produced for the chirp identified in FIG. 6.

The characteristics of a single chirp are shown in FIG. 6, in which frequency is plotted against time. In this example, the chirp is initiated at zero frequency and ascends, over a period of 1 millisecond to 100 Khz. The resulting sinusoid is shown in FIG. 7, in which the frequency of the sinusoid rapidly increases over time. Although there is a frequency shift in the chirp frequency due to Doppler shifting effects these are negligble compared with the frequency offsets at the carrier frequency, and are hence ignored.

Figure 8:
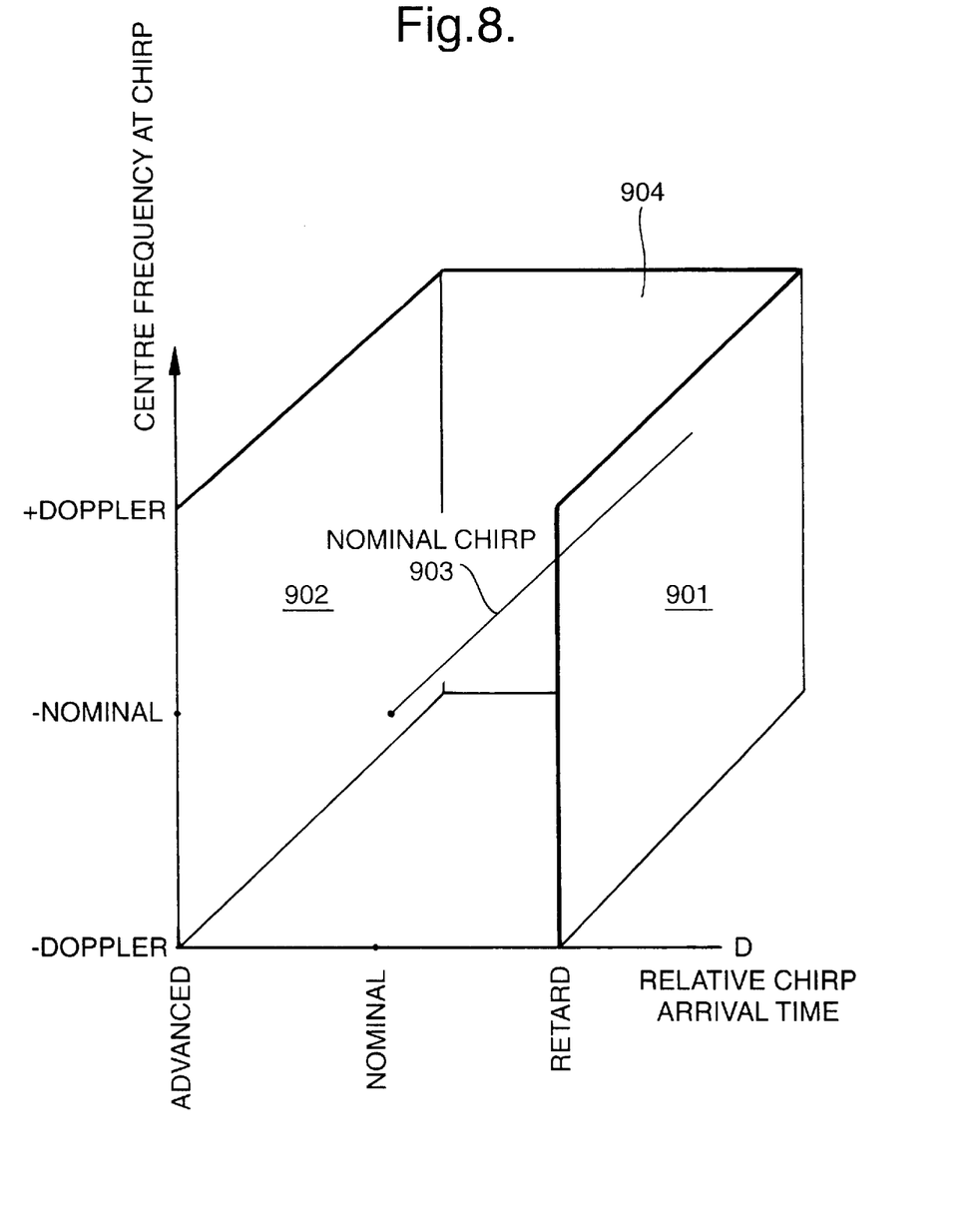
FIG. 8 shows the effects of time shift on the chirp shown in FIG. 6.

The effect of delay is illustrated in FIG. 8. If the transmission of the chirp is delayed, i.e. retarded, the frequency sweep will occur late and at extreme conditions, the frequency response will lie within region 901. Similarly, relatively nominal negative delay may occur, effectively advancing the transmission of the chirp, resulting in a frequency response lying within region 902. The nominal chirp is shown as line 903. Thus, under all possible operating conditions, the frequency chirp may be detected anywhere within region 904 and when analysing the received data in order to identify the start of a message, frequency changes due to Doppler shifts may be considered as moving the region of interest 504, in FIG. 5, along axis 501. Similarly, chirp arrival time variations within region 904 may be considered as variations along axis 502 within the overall allowable region 503. Thus, it can be appreciated that in order to correctly identify the start of the message, it is necessary to consider all of these possibilities to accurately determine the location of region 504 within the available space. In known systems, such a procedure is time consuming, computationally demanding, consumes significant amounts of electrical power and requires substantial amounts of randomly accessible storage or complex ASICs. Furthermore, given that these techniques are required to detect paging signals for incoming calls, and that such detection is required periodically during the standby mode of the phone, there is placed an ongoing demand upon the power supply.

The transmission and detection of frequency chirps are well known in the radar art and relatively simple circuits are available for detecting the presence of a chirp. Circuits of this type may be used in the present embodiment in order to detect the presence of a marker within received signals. Upon detection of this marker, using circuits of relatively low power consumption, processing circuits embodying the present invention may be activated.

In accordance with the present invention, a transmitted marker is received and processed by correlating said marker to produce two amplitude peaks, whereafter characteristics of said peaks are processed to determine an extent of Doppler effect. Thus, in addition to providing a mechanism for detecting the presence of a marker, the received chirp signals may be processed in order to generate Doppler-related information. In particular, the chirp data may be processed in order to determine frequency shifts and temporal offsets.

In a first embodiment, the incoming signal is digitised and a received chirp is processed by analysing digital samples. An incoming chirp is quantised to 64 levels between −31 and +31 in an A/D converter and is shown graphically as 1001. These samples are supplied to a signal-shift-register (FIFO) of a correlator as 6-bit words and are clocked through said register at the sampling rate. In an optimal correlator this signal is them multiplied sample by sample by its replica stored in the fixed reference-fixed-register 1007 and the individual multiplication results are then summed in 1008 resulting in a high output signal when the signals are in phase. The values in the reference-shift-register can be scaled without affecting the signal-to-noise ratio at the summer output. Thus, on each clock period, a snapshot is provided of a predetermined number of samples, that are in turn correlated against a stored chirp signature. In the foregoing example the multipliers 1008 are 6 bit by 6 bit multipliers requiting complex hardware or a high number of DSP cycles, which lead to high current consumption. An added drawback is that the DSP solution is usually unable to run in real time.

Figure 9:
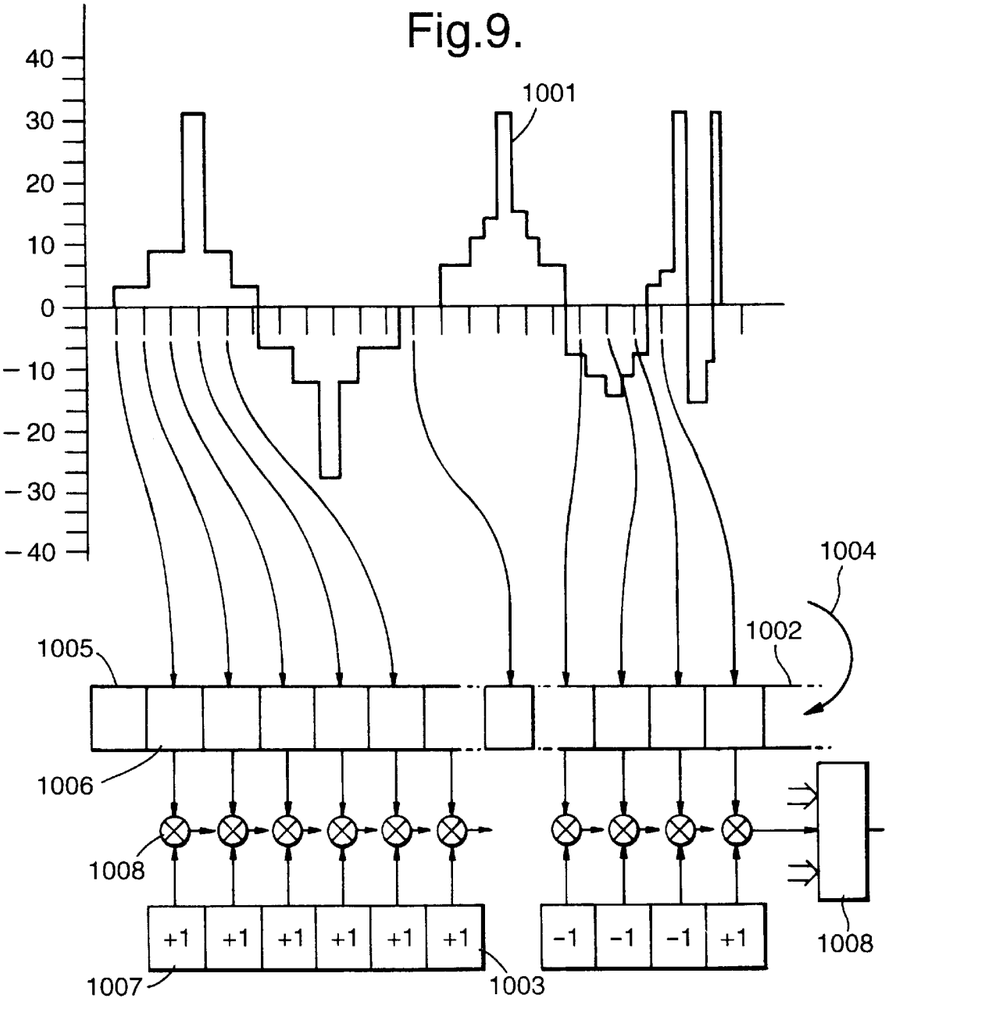
FIG. 9 shows a quantized receiver sinusoid of the type shown in FIG. 7 along with correlation circuitry.

In a further embodiment a simplified method has been developed. The penalty in terms of sensitivity for this method is only in fractions of dB, which is acceptable in most cases. Instead of storing the reference signal using high resolution, a simple 3 level approximation is used. An embodiment in accordance with this simplified method is shown in FIG. 9. The chirp signature is held in a low definition register 1003, consisting of positive values, zero values and negative values. As shown in FIG. 9, sample values illustrated at 1001 have been supplied to the shift register and are clocked through said register in the direction indicated by arrow 1004. The position of highest correlation is shown in FIG. 9, representing the point at which the chirp has been received and is effectively in phase, within the shift register, with the chirp signature. The first value for the chirp, at location 1005, represents a zero, therefore no value is stored in register 1003. The second location 1006 contains a positive value, therefore +1 is stored in register 1003 at location 1007. Thus, all positive values of the incoming chirp are effectively multiplied, in respective multipliers 1008, by positive unitary values, whereas all negative values of the received chirp are similarly multiplied by negative unitary values, resulting in only positive values being supplied to summation circuit 1008 when an incoming chirp signal is in phase with the stored chip signature. Furthermore, the quality of the peaks is very high, given that cancellation values will be generated as soon as the quantised chirp is correlated at positions that are slightly before or slightly after the optimum correlation point. Thus, the procesing power or hardware required for correlation is reduced relative to the full correlation technique.

In the satellite system the nature of the signal 1001 will be modified if the frequency is shifted due to Doppler effects. In particular, the frequency may be effectively increased, or similarly, the frequency may be decreased when a satellite is moving away from the telephone's location. The effect of these frequency expansions and compressions may be considered with reference to FIG. 7. If the frequency is increased, earlier parts of the frequency sweep will take on frequencies that are higher than they should be, relative to their location in the originally transmitted signal. Thus, positions at early parts of the transmission will behave as if they were later parts of the transmission, i.e. having a higher frequency. Similarly, if the frequency is reduced, a particular location in the chirp will be displaced, appearing to arrive earlier than it should.

Figure 10:
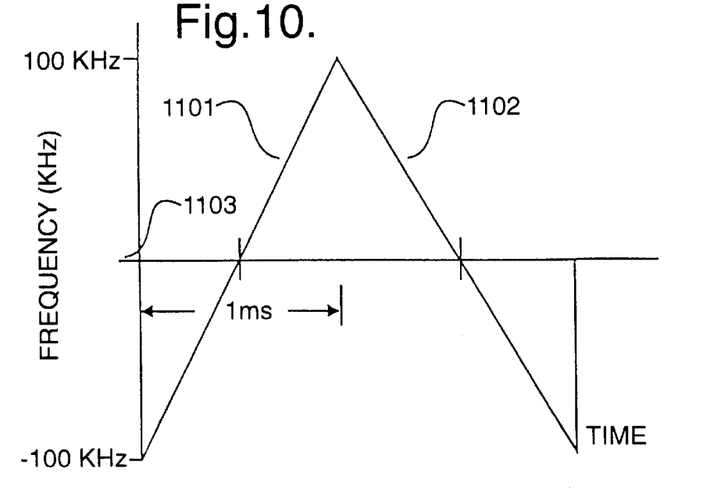
FIG. 10 shows a chirp generated in accordance with the present invention.

The present invention takes advantage of this characteristic in order to determine the position of the message accurately and the frequency modifications present due to Doppler effects. In order to achieve this the frequency chirp consists of an ascending chirp 1101 followed by a descending chirp 1102, as shown in FIG. 10. The transmitted signal has a notional centre frequency 1103 and this frequency is reduced by 100 KHz so as to start the initial ascending chirp at a frequency of the nominal frequency minus 100 KHz. From this position the frequency is modified over a duration of 1 millisecond up to a value of the nominal frequency plus 100 KHz. Thereafter, the frequency is adjusted in a similar way, descending from the nominal frequency plus 100 KHz to the nominal frequency minus 100 KHz. These reversals could, alternatively, be performed in the inverted sense. Similarly, chirp rates and durations are not critical and the values identified above are given as examples.

At the receiver, the signal is sampled and supplied to an arrangement of a shift register with values correlated against a reference register of the type shown in FIG. 9. However, on this occasion, the signal of interest is similar to signal 1001 and consists of a sinusoid of increasing frequency, of the type shown in FIG. 9, followed immediately by a sinusoid of decreasing frequency, effectively the mirror image of signal 1001. However, given that one of the frequency sweeps is ascending, while the other is descending, Doppler frequency shifts will have opposite effects in terms of advancing or retarding the amplitude peak position, i.e. the correlation point.

Figure 11:
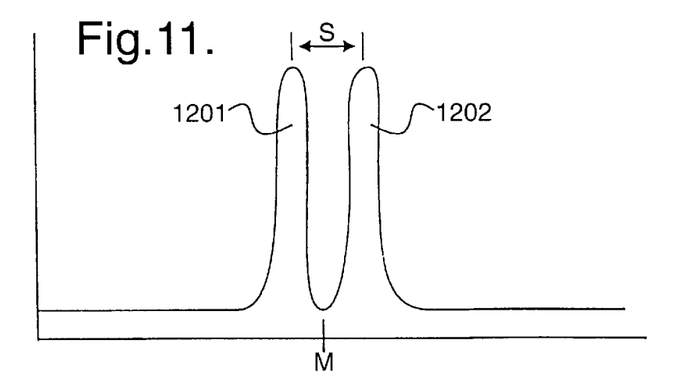
FIG. 11 and FIG. 12 show the effects of correlating a received chirp of the type shown in FIG. 9 with a predetermined reference; and, FIG. 13 shows an alternative embodiment for correlating a received chirp, including a standing acoustic wave filter.
Figure 12:
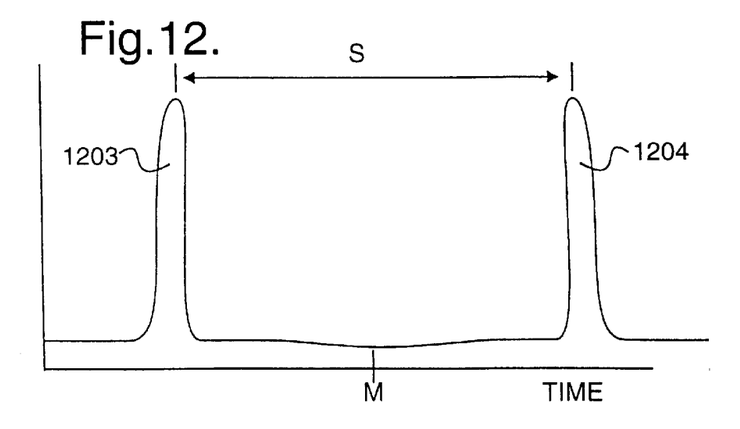

The effects of Doppler frequency variations upon output signals derived from frequency sweeps of the type shown in FIG. 10 are represented in FIGS. 11 and 12. Under conditions where the transmission frequency is effectively increased, due to a Doppler effect, the signal will appear to have been advanced given that a relatively high frequency, which should arrive over time T2, say, will actually appear to have been received at time T1. Thus, peak 1201 will tend to move negatively, i.e. left towards the y axis as the Doppler effect increases the perceived frequency. However, the second peak 1202, created by the descending frequency sweep, will move positively away from the y axis, by an equivalent amount, when an increase in frequency occurs. Thus, if the first peak moves negatively due to an increase in frequency and the second peak moves positively by an equal amount, due to an increase in frequency, the mid-point M between the peaks remains unchanged. Thus, the location of position M may be determined, in order to give a definitive phase location to the start of the message, i.e. the temporal offset irrespective of frequency modifications created by Doppler effects.

Similarly, if the Doppler effect reduces the perceived frequency, the two peaks 1201 and 1202 will move closer together by equal amounts, again resulting in the mid-point not undergoing a shift in its location. Thus, in FIG. 11 the position of the peaks may be considered as being brought closer together due to a frequency expansion, whereas, in FIG. 12, peaks 1203 and 1204 have been spread further apart due to a frequency contraction.

The extent to which the peaks are separated, which may be considered as the peak spread, is directly dependent upon the frequency shift due to the Doppler effect. Thus, by measuring the peak spread S, it is possible to accurately calculate the frequency modifications due to Doppler effects. Thus, the calculation of the frequency modification, derived from the peak spread S, and the phase location of the start of the message, derived from mid-point M, allows the location of the start of the message, defined by the ascending and descending frequency chirp, to be quickly and accurately located within the space 503 shown in FIG. 5. Thus, referring to FIG. 4, the size of storage device 404 may be reduced significantly, thereby reducing processing overhead and power consumption.

The ascending and descending chirps may initially be used to provide information to the effect that a marker has actually been sent, without at this stage knowing the extent of any frequency shift and temporal offset to any degree of accuracy. However, the identification of the marker will initiate more detailed processing, of the type described herein, so as to identify frequency offset, using real-time processing techniques, in addition to identifying the point at which the actual transmitted message starts, at a variable duration after the presence of the chirp, due to the presence of the Doppler effects calculated by processing the chirp signal.

Figure 13:
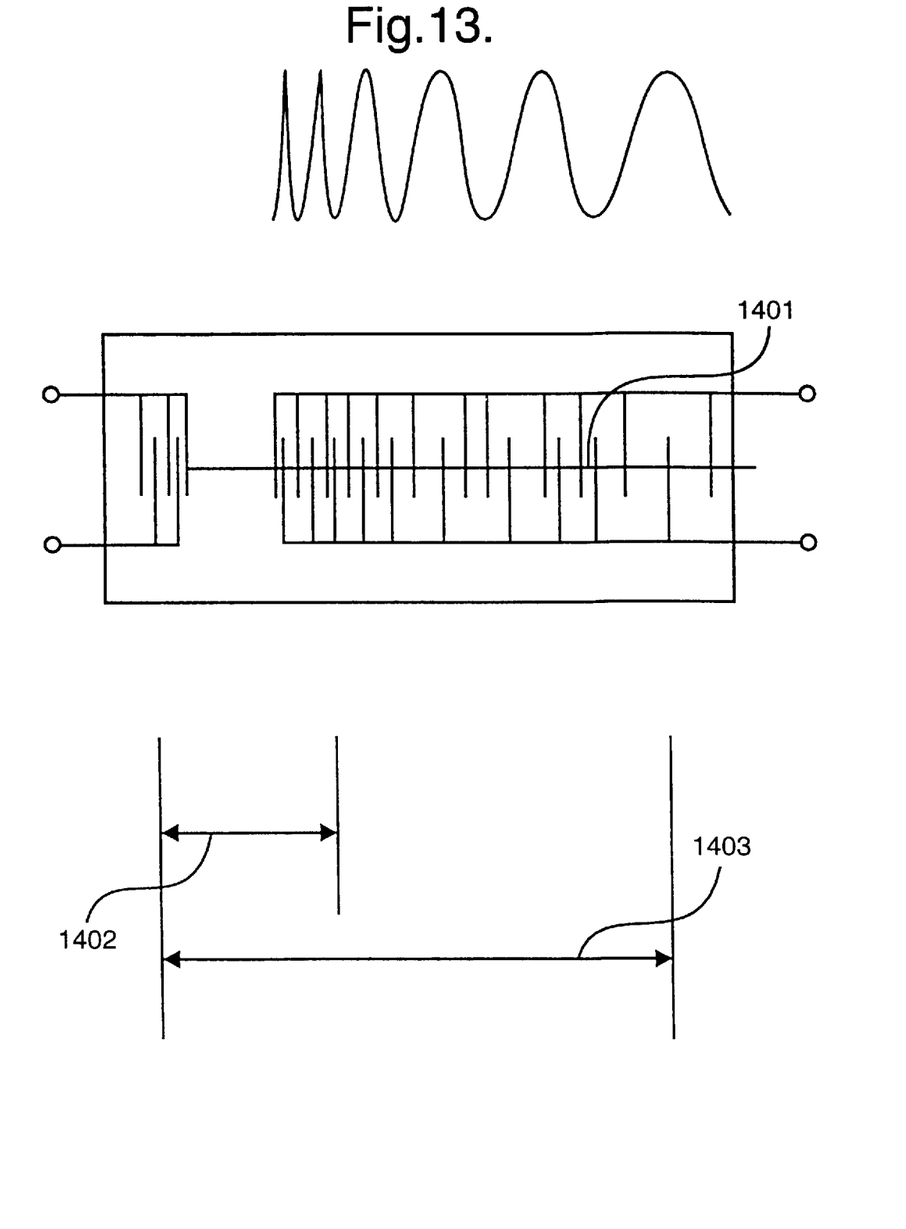

An alternative embodiment is shown in FIG. 13, in which the incoming chirp signal is supplied to a standing acoustic wave (SAW) analogue filter. Using a filter of this type, amplitude peaks are generated without digital sampling of the received chirp signal, thereby reducing power consumption during standby conditions.

The amplitude of the FM chirp signal is constant but, as previously described, the instantaneous frequency varies linearly with time. The finger spacing of the SAW delay line 1401 is varied along its length to match the frequency variations across the chirp and to thereby correlate with it. As shown in FIG. 14, the fingers to the left of the array respond to the higher frequencies, with fingers to the right end of the array responding to lower frequencies. At the instance shown, the chirp signal, travelling to the right, registers exactly with the array, in a similar fashion to that in which the digital samples were supplied to the shift register shown in FIG. 9. Thus, the arrangement is substantially equivalent to the digital implementation.

The result of the configuration shown in FIG. 13 is that an intense output pulse is obtained at the right terminals. The arrangement is a dispersive filter in which the low frequency end of the signal is delayed more than the high frequency end, allowing the trailing edge of the long input pulse to catch up with the leading edge, thus effectively collapsing the pulse. As shown in FIG. 13, a short path length 1402 is provided for high frequency components with a much longer path length 1403 being provided for the low frequency end of the pulse. The filter shown in FIG. 13 is accompanied by its mirror image, resulting in a first part generating a correlated pulse for the ascending chirp and a second part generating a correlated pulse for the descending chirp.

What I claim is:

1. A method of processing a paging signal from a satellite transmitter, wherein said paging signal includes an encoded marker in the form of a first frequency sweep followed by a second frequency sweep, wherein the direction of said second sweep is in the opposite sense to the direction of said first sweep, said paging signal being susceptible to Doppler effects such that the timing phase and frequency of said signal are variable, the method comprising the steps of:
   receiving said paging signal;
   detecting said marker and correlating said received marker to produce two amplitude peaks; and
   processing characteristics of said peaks to determine an extent of Doppler effect.

2. A method according to claim 1, wherein an encoded marker is located prior to being processed.

3. A method according to claim 1, wherein said first sweep ascends from a lower frequency to a higher frequency whereafter said second sweep descends from a higher frequency to a lower frequency.

4. A method according to claim 1, wherein said sweeps occur from a first side of an allocated frequency level to the opposite side of said allocated frequency level.

5. A method according to claim 1, wherein said received marker is sampled and digitised, whereafter said digitised samples are correlated against stored values to produce said amplitude peaks.

6. A method according to claim 5, wherein digital samples are supplied to a shift register and said shift register is clocked at the digitised value sample rate.

7. A method according to claim 6, wherein non-zero values of said predetermined values are multiplied with values read from the shift register.

8. A method according to claim 1, wherein a mid point between said peaks is identified so as to define the position of said transmitted marker.

9. A method according to claim 1, wherein the distance between said peaks is determined in order to define Doppler frequency shift.

10. Mobile telephone apparatus arranged to receive paging signals from a satellite transmitter, wherein said paging signals comprise a marker in the form of a first frequency sweep followed by a second frequency sweep, wherein the direction of the second sweep is in the opposite sense to the direction of said first sweep, comprising
    correlating means for correlating said received marker to produce two amplitude peaks; and
    processing means for processing characteristics of said peaks to determine an extent of a Doppler effect.

11. Apparatus according to claim 10, including locating means arranged to locate an encoded marker prior to correlating said encoded marker.

12. Apparatus according to claim 10, including means for producing an amplitude peak in response to a first sweep which ascends from a lower frequency to a higher frequency and means for generating a second amplitude peak in response to a second sweep which descends from a higher frequency to a lower frequency.

13. Apparatus according to claim 11, wherein said sweeps occur from a first side of an allocated frequency level to the opposite side of said allocated frequency level.

14. Apparatus according to claim 10, including sampling and digitising means for digitising said received marker.

15. Apparatus according to claim 14, wherein said correlating means includes storage means arranged to store values that are correlated against said digitised samples.

16. Apparatus according to claim 14, wherein said correlating means includes a shift register for receiving said digitised samples.

17. Apparatus according to claim 14, wherein said correlating means includes means for multiplying non-zero stored values with digitised sample values.

18. Apparatus according to claim 10, wherein said correlating means includes two standing acoustic wave filters each tuned to produce an output peak in response to a respective received frequency sweep.

19. Apparatus according to claim 10, wherein said processing means is arranged to calculate a mid-point between said peaks to determine the position of a transmitted marker.

20. Apparatus according to claim 10, wherein said processing means includes means for determining the distance between said peaks so as to determine a degree of Doppler frequency shift.

21. A method of processing an encoded marker in a transmitted signal, wherein said signal is susceptible to Doppler effects such that the timing phase and frequency of said signal are variable, comprising the steps of:

transmitting said marker in the form of a first frequency sweep followed by a second frequency sweep, wherein the direction of said second sweep is in the opposite sense to the direction of said first sweep;

receiving and supplying said marker to a surface acoustic wave filter and correlating said received marker to produce two amplitude peaks; and processing characteristics of said peaks to determine an extent of Doppler effect.

* * * * *